Aug. 9, 1927.
V. O. CORNWELL ET AL
1,638,620
METHOD AND APPARATUS FOR SHAPING ARTICLES OF GLASS
Filed March 17, 1923   2 Sheets-Sheet 2
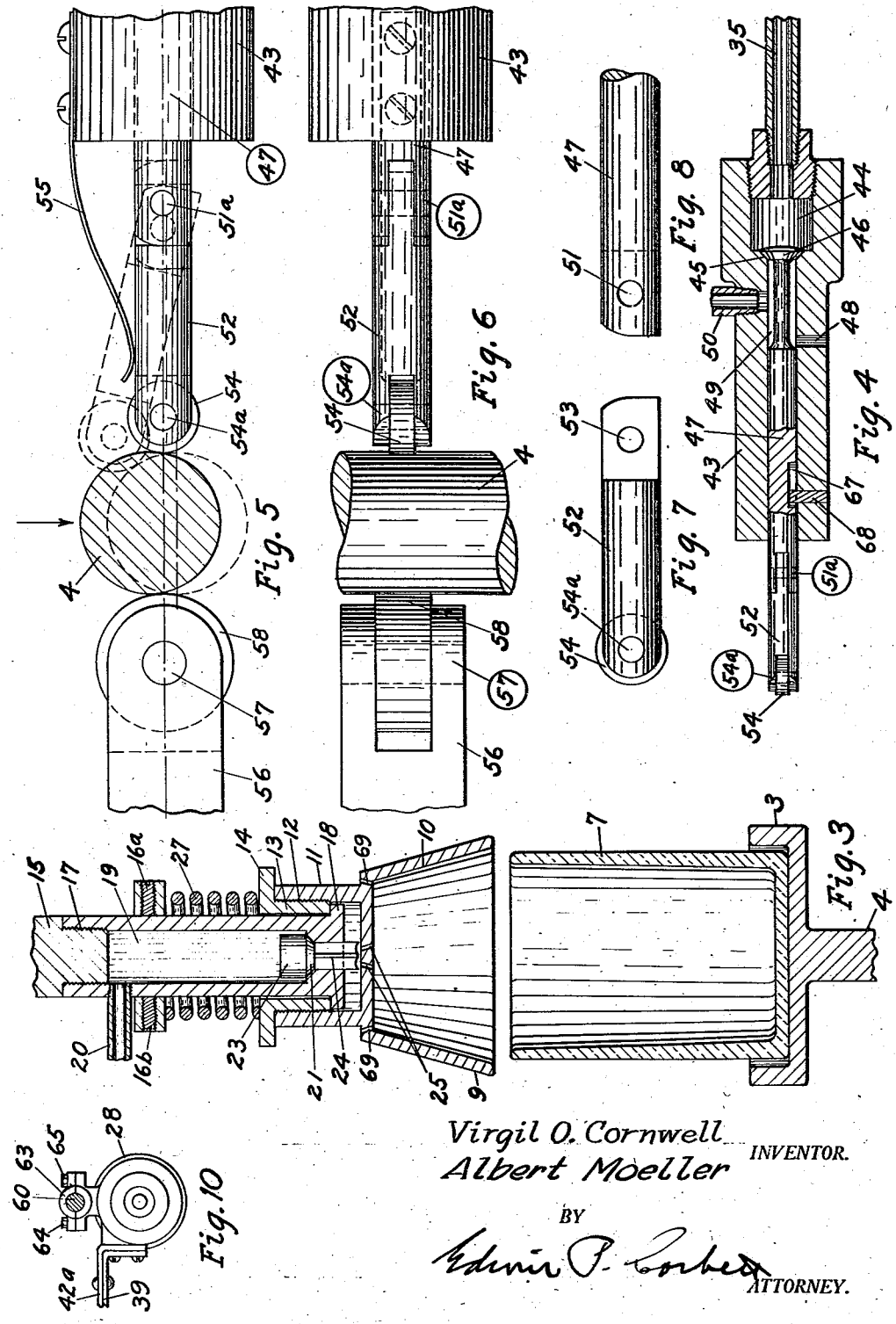
Virgil O. Cornwell
Albert Moeller   INVENTOR.
BY
Edwin P. Corbett
ATTORNEY.

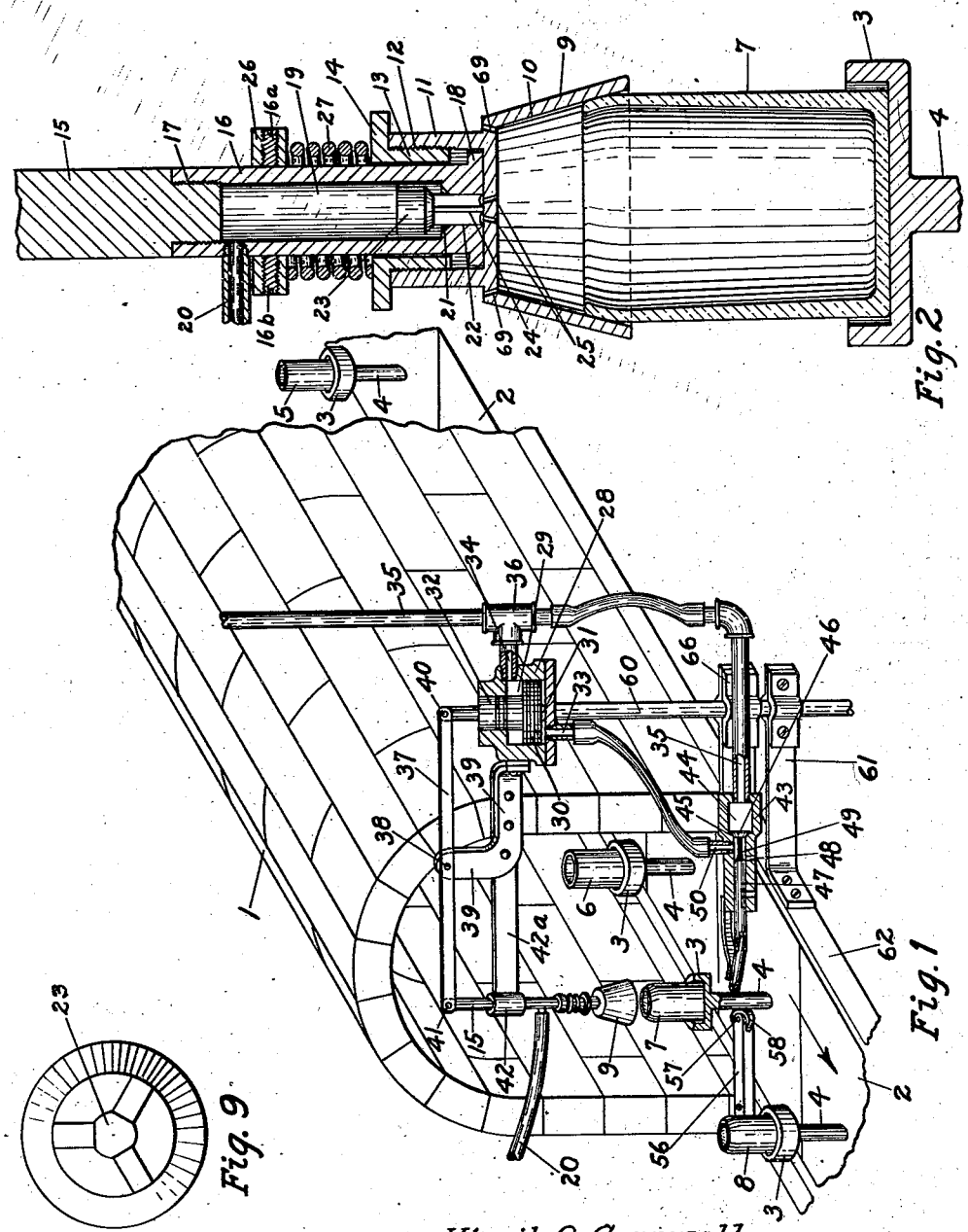

Patented Aug. 9, 1927.

1,638,620

UNITED STATES PATENT OFFICE.

VIRGIL O. CORNWELL AND ALBERT MOELLER, OF COLUMBUS, OHIO, ASSIGNORS TO THE FEDERAL GLASS COMPANY, OF COLUMBUS, OHIO, A CORPORATION OF OHIO.

METHOD AND APPARATUS FOR SHAPING ARTICLES OF GLASS.

Application filed March 17, 1923. Serial No. 625,718.

Our invention relates to method and apparatus for shaping articles of glass and, more particularly to method and apparatus for shaping tumblers, dishes, vases and other similar glass articles.

In the case of hotels, restaurants and other places where it is customary to handle and use a large number of tumblers, much loss is experienced due to breakage and chippage when using straight-sided tumblers. Breakage or chippage takes place as a result of the tumblers contacting at their top edges, for instance, when several tumblers are grasped side by side, in one hand and also as the result of nesting a large or small quantity of tumblers.

Heretofore, in order to eliminate breakage and chippage loss due to the hereinbefore mentioned causes, it has been proposed to shape or "cup in" the top edges of the tumblers in such a manner and to such an extent that they cannot be nested, nor will the top edges contact when several tumblers are grasped side by side in one hand or otherwise.

It has been customary to "cup in" or similarly shape tumblers by the hand method, and attempts have also been made to accomplish such shaping of tumblers or other similar glass articles by both automatic and semi-automatic methods.

Apparently, up to the present time the hand method has been the most successful method of "cupping in" or similarly shaping tumblers. The hand method comprises the forming of a straight-sided tumbler by pressing or blowing or any other method known in the art, such straight-sided tumbler being commonly called a blank. After the blank is formed, it is then reheated in any desired manner, such as in a glory hole, and the shaping is then effected by rotating the blank and shaping the glass with a suitably provided buffer or wooden paddle. The hand method requires much time in manipulation and, at its best, is most unsatisfactory because the product resulting therefrom is not uniform in shape or thickness, which is quite natural since uniformity must depend upon the eye of the workman. This is a very detrimental aspect when viewed from a commercial standpoint. Also, the hand method necessitates the use of highly skilled labor and very slow working with a resultant slow production which makes the production of this type of glass articles by the hand method exceedingly expensive.

Furthermore, it has not been found practicable to make "cupped in" or similarly shaped tumblers by automatic or semi-automatic methods because no means has as yet been devised for insuring uniformity of product and because in all instances it has been found that by such methods the tumbler wall crinkles and becomes deformed at the point at which the wall starts to turn in. Also, due to the plastic condition of the glass, the tumbler tends to lose its shape which together with the objections hereinbefore stated makes the "cupped in" or similarly shaped tumblers produced by such means and methods unfit for commercial use.

One of the objects of our invention is to provide an automatic method and means for "cupping in" or similarly shaping tumblers, dishes, vases or similar glass articles whereby uniformity of product is effected and insured.

Another object is to eliminate the use of skilled workmen and increase production whereby the cost of production is greatly reduced.

Still another object is to provide an automatic means for "cupping in" or similarly shaping tumblers, dishes, vases or other similar glass articles whereby defects heretofore prevalent in automatic and semi-automatic methods are overcome, resulting in a commercially successful product.

Other and further objects will be obvious by referring to the specification following and to the drawings attached hereto and made a part hereof, wherein—

Figure 1 is a perspective view of an apparatus employing our invention, showing part of the operating mechanism in section.

Figure 2 is an enlarged detail sectional view of the blank shaping means in shaping position on the blank.

Figure 3 is an enlarged detail sectional view of the blank shaping means in position above the blank and before it has moved down upon the blank.

Figure 4 is an enlarged detail sectional view of the valve mechanism for controlling the movement of the shaping means.

Figure 5 is an enlarged top view of a portion of the control valve operating mechanism, the stem of the support for carrying the blank being shown in section.

Figure 6 is a side view of the structure shown in Figure 5 with only a portion of the support for carrying the blank being shown.

Figure 7 is an enlarged view of the stem extension portion of the control valve operating mechanism.

Figure 8 is an enlarged view of the outer end of the valve stem of the control valve operating mechanism.

Figure 9 is an enlarged bottom view of the valve in the shaping means for controlling the admission of fluid pressure to the interior of the blank.

Figure 10 is a top view of the differential piston structure showing the manner in which such structure is mounted and supported.

In carrying out our invention, it is first necessary for the article to be partially shaped into what is commonly called a blank, this partial shaping being accomplished by pressing or blowing in a mold or by any other known or applied means. In the case of a tumbler, the partially shaped article so formed resembles a straight-sided tumbler and in each instance where the same is hereinafter mentioned, such partially formed article will be referred to as a blank.

In shaping glassware, such as tumblers or other similar glass articles, in accordance with our method and our apparatus, we provide a suitable heating chamber to which the articles to be shaped are transferred. We have shown no means for forming the glass blank, but it is understood that this blank may be formed by any desired method and means such as by pressing or blowing. After the tumbler blank has been formed and removed from the forming means, it is transferred to and carried through the heating chamber. After the blank has passed through the heating chamber and has been heated to the proper temperature and is in the desired plastic state, a shaping means is caused to move upon the said plastic blank, and form the same to the desired shape. This action is accomplished automatically and without human intervention.

In the shaping of certain kinds of ware, we provide means for supporting and shaping the internal wall of the tumbler. This is done so that no crinkling or deformation of the inner wall will take place during the shaping of the blank. To accomplish this, when desired, we provide means for automatically supplying fluid pressure to the interior of the glass blank being shaped, this action being effected simultaneously with the external shaping of the tumbler. In effecting this, we provide with our shaping means and for the operation of the same, suitably provided valves and operating mechanism as shown in the hereto annexed drawings.

There may be instances where it is desirable not to employ any internal shaping or supporting means and it is obvious that our invention may be so employed, without departing from its scope, by merely cutting off the fluid pressure employed for that purpose. However, we have found that the use of an internal supporting or shaping means is important in some classes of ware.

We have shown our method as used in connection with a continuously moving conveyor which carries the blanks through the heating chamber. It is highly desirable in uniformly shaping the blank, that the external shaping means shall contact uniformly with the blank at predetermined times and we accomplish this by providing for the timing of the movement of the shaping means in relation to the movement of the blank carrier, the said movement of the shaping means to shape the blank being controlled by and operating synchronously with the movement of the blank carrier. By such provision the shaping of the blank may be effected while the blank is in motion and without disturbing its travel.

Furthermore, in carrying out our invention, it is necessary that the movement of the shaping means to and from the blank be accomplished at predetermined times while the blank is therebeneath and before it moves therefrom so as to prevent any deformation of the glass article by the shaping means. To effect this, we provide a novel form of snap acting control mechanism, the operation of which is dependent upon the movement of the blank carrier through the heating chamber. This control mechanism is so employed that the shaping means is moved upon and away from the blank in a minimum length of time so that it is in contact with the blank only momentarily.

Referring particularly to the drawings, the numeral 1 represents a heating chamber having a blank conveyor 2 passing through the same. This conveyor 2 may be of any desired construction and may be moved in any desired manner to suit the preference of the user. The heating chamber 1 is heated to such a degree that the glass blank when passing therethrough will be heated to a higher degree than when its formation by the forming means is completed and will be sufficiently plastic to permit the desired shaping. Arranged at intervals upon the carrier 2 (see Figure 1) are blank supports, each of which comprises a seat portion 3 and a stem 4 which is rigidly secured to the carrier. The numerals 5 and 6 represent tumbler blanks in place in their respective seat portions 3 on the carrier 2. The blanks may be removed from the blank forming apparatus and placed as shown by any suitable and desired means. The blank 5 is shown at a position on the carrier 2 before passing through the heating chamber 1 and the blank 6 is shown at a position in the heating chamber 1. Numerals 7 and 8 represent shaped tumblers in position in their respective supports 3 on the carrier 2. The tumbler 7 is shown at a position beneath the shaping head 9 while the tumbler 8 is shown at a position after it has been shaped and moved beyond the shaping head 9.

Our invention is shown as applied to the "cupping in" of tumblers and, in effecting such shaping of the tumbler blank, we employ an automatically reciprocating shaping head 9 which is adapted to move down and over the glass blank to shape it. The shaping head 9 is best shown in Figure 2 of the drawings. It may comprise a bottom bell-shaped portion, the inner surface 10 of which is adapted to contact with the external surface of the glass blank. This interior contacting surface 10 is very smooth and is highly polished in order that it will not make and leave any marks upon the glass blank shaped by it. The angle of inclination or shape of the surface 10 may be varied to effect the desired amount of "cupping in" or other shaping, which may vary under different conditions of use, said variation being accomplished without affecting any of the operations of our invention. Integrally formed therewith and extending upwardly from the shaping head 9 at approximately right angles is a hollow cylindrical or collar portion 11. This collar portion 11 is internally threaded as at 12 and the sleeve 13 is adapted to be screwed into it. It will be noted by referring to Figure 2 of the drawings that the sleeve 13 has a flange 14 at its upper portion, said sleeve being adapted to seat upon the top of the collar 11 when the sleeve 13 is screwed all the way in; and the flange 14 is wide enough to extend over and out from the external surface of the said collar portion 11.

The shaping head 9 is detachably secured to a reciprocating stem 15, the means for reciprocating the stem 15 being hereinafter more fully described. In detachably securing the shaping head 9 to the stem 15, we preferably employ a detachable and hollow coupling 16, the upper end of which is secured to the stem 15 by the threaded portion 17. The extreme lower external portion of the coupling 16 terminates in a flange 18. In attaching the shaping head 9 to the stem 15, we first secure the stem 15 and coupling 16 at the threaded portion 17. We then place the lower end or flanged portion 18 of the coupling 16 inside of the collar portion 11 (the sleeve 13 at that time being removed), after which we screw the sleeve 13 in place in the collar 11 until the flange 14 of the same seats upon the top of the collar 11. It will be noted that the sleeve 13 when screwed into place does not contact at all times with the flange 18 of the coupling 16, but instead permits of a slight upward movement of the flanged portion 18. (See Figures 2 and 3.) The reason for this will be explained hereinafter.

When the hollow coupling 16 is secured in place as described, an air chamber 19 is formed to which is connected a constant supply of fluid pressure, preferably air, through the pipe 20. The air may be supplied through the pipe 20 from any suitable source and at any desired pressure as necessitated by the conditions of use. The lower end of the chamber 19 is reduced in diameter and shaped so as to form a valve seat 21 which terminates in a reduced opening 22. Contained within the chamber 19 at its lower part is a valve 23 which is adapted to seat upon the valve seat 21. The valve 23 has a winged stem 24 (as shown in Figures 2, 3 and 9) which extends through and is guided in the opening 22 in such a way that air will readily flow past it when the valve 23 is raised from its seat. At or near the center of the top of the bell portion of the shaping head 9 are air passages 25 which register with the opening 22 in the bottom of the coupling 16. It will be noted that the flange 18 of the coupling 16 is adapted, in its lowermost position, to seat upon the top portion of the bell shaped shaping head 9. It will be noted further that the end of the wings of the valve stem 24 are cupped so that they will permit air to flow freely under and past them when the end of the valve stem 24 is contacting with the top of the bell portion of the shaping head 9, and the valve 23 is unseated. By the above arrangement, when the shaping head 9 is moved to contact with the glass blank 7, a collapsing movement between the shaping head 9 and coupling 16 takes place, that is, the bell portion of the shaping head 9 will first contact with the top of the blank 7 and the stem 15 will continue to move downward until the flange 18 of the coupling 16 contacts with the top of the bell portion of the shaping head 9. The stem 15 continues to move downward and the shaping head 9 is moved down over the blank thereby shaping the contacting portion of the blank to conform to the shape of the surface 10 of the said shaping head 9. When the flanged portion 18 of the coupling 16 seats upon the external bell shaped portion as described, a sufficiently tight joint is formed at such contacting point to prevent the escape of air past the same up and around the coupling 16.

When the shaping head 9 contacts with the glass blank 7 and the stem 15 and coupling 16 continue to move downwardly (see Figure 2), the stem 24 of the valve 23 is moved so as to unseat the valve 23, permitting air pressure to flow from chamber 19, past valve 23, and through passage 25 to the interior of the bell portion of the shaping head 9 and, consequently, to the interior of the glass blank 7 which is being shaped. By this action, sufficient air pressure is admitted to and acts upon the interior wall of the glass blank 7 to counterbalance the pressure of the shaping head 9 on the external surface, whereby the interior wall of the blank 7 is shaped and supported uniformly so that no crinkling or other deformation of the internal surface of the glass blank occurs during the shaping period.

The shaping head 9 is of such shape that a tight seal is made between its internal surface 10 and the external surface of the blank when they contact; therefore, unless otherwise provided for, when the shaping head contacts with the blank and air pressure is admitted to the interior of the blank, the air admitted is trapped thereby cushioning and tending to retard the full downward movement of the shaping head to shape the blank. To prevent such a condition and guard against any possible drawback thereof and to insure, under all conditions, the full downward movement of the shaping head 9 over the blank, we provide vent holes 69 which permit escape of part of the air so admitted to the interior of the blank. The vent holes 69 are of such size that the admission of air through the shaping head to the blank by the way of valve 23 and ports 25 is at a faster rate than the exhaust of air through such vent holes, whereby air pressure is present under the blank at all times during shaping to properly shape and support the internal wall. It is obvious that there may be instances where the air applied is of such low pressure that the above provision need not be made. In such an event, the vent holes 69 may be omitted.

When supporting and shaping the blank internally, it is desirable that the valve 23 be closed when the shaping head 9 is moved away from the shaped tumbler in order to prevent the escape of air during the inoperative period of the shaping head. This is accomplished by employing a removable and adjustable collar 26 around the coupling 16, this collar 26 being held in place on the coupling 16 by suitably provided set-screws 16$^a$ and 16$^b$. Between this collar 26 and the flange 14 of the sleeve 13 is a coil spring 27. The collar 26 is so adjustable upon the coupling 16 that free movement of the coil spring 27 in its release position is prevented and so that when the flanged portion 18 of the coupling 16 moves toward the bell portion of the shaping head 9, the coil spring 27 will be compressed. With this construction, it is readily seen that as the shaping head 9 is moved out of contact with the tumbler 7, the spring 27, which is under compression at that time, moves the shaping head 9 away from the collar 26 until the flanged portion 18 of the coupling 16 contacts with the bottom of the collar 13, thereby freeing the end of the valve stem 24 and permitting the weight of the valve 23 plus the air pressure in chamber 19 to seat and hold seated the valve 23.

We provide a differential type of cylinder and piston structure (see Figure 1) for controlling the movement of the stem 15. This structure may comprise a casing 28 containing a piston chamber 29 within which operates a differential piston 30. The larger face of this piston 30 has a small projection 31 which prevents the said face of the piston 30 from sealing against the cylinder head in its lowermost position so that air pressure, when applied, will immediately become effective upon the entire piston face and cause the piston to move upwardly quickly. Piston rings are provided in the piston 30 so as to prevent leakage of air from one side to the other. Connected to and moved by the piston 30 is a piston stem 32 which is of a comparatively large size and which serves to reduce the area of the piston face to which it is connected below the area of the large piston face. The piston face carrying the stem 32 and opposite the one having the projection 31 will be hereinafter termed the smaller piston face. The stem 32 extends up through and is guided by the valve casing 28, the proper seal against leakage at that point being provided by piston rings as shown in Figure 1. Suitably connected to the valve casing 28 and leading to the large face of the piston 30 is a pipe 33 through which air pressure is admitted and exhausted; and connected to the smaller piston face is a pipe 34 through which air pressure is admitted from the main supply pipe 35 through pipe connection 36. Air is intermittently admitted to and exhausted from the large face of the piston 30 through the pipe 33 as will be hereinafter described, while air pressure is constantly present upon and admitted to the smaller face of the piston 30 whereby the piston 30 with its stem 32 is intermittently moved up and down. The up and down movement of the piston 30 is effected by its differential construction, that is, when pressure is admitted to the large face of the piston 30, the pressure acting on the smaller piston face is overcome and the piston 30 is moved upward; and, when pressure is exhausted from the large face of the piston 30, the constant pressure acting on the smaller piston face moves the said piston 30 downward.

The differential cylinder and piston structure is adjustably carried on a vertical standard 60 which is clamped to and held rigid by the plate or arm 61. The plate or arm 61 is rigidly secured to the carrier frame 62. The vertical standard 60 may extend past the plate 61 to the floor so as to assist in holding it rigid and free from vibration. The casing 28 of the differential piston structure is mounted on the standard 60 by the clamp portion 63 and may be fastened in the desired position on such standard by tightening up the bolts 64 and 65. By using such clamping means, it is obvious that the bolts 64 and 65 may be loosened and the differential cylinder and piston structure moved up or down on the standard or rotated around the standard.

It will be understool that, although not shown, an asbestos shield or other adequate means is employed at the ends of the heating chamber to retain the heat therein as well as protect our apparatus from the heat. Such shielding means, of course, is so shaped as to permit entrance and exit of the blanks carried by the carrier 2.

The piston stem 32 terminates in a reduced portion which has a drilled hole in its end for the insertion of a bolt. Attached and pivoted to the protruding end of the piston stem 32 by a bolt 40 is a lever 37 which is fulcrumed at 38 to a support 39. This support 39 is rigidly secured to the casing 28 as shown in Figures 1 and 10. The opposite end of the lever 37 is pivoted to the stem 15 by a bolt or pin 41. The stem 15 is slidably held and guided in true axial alignment with the glass article 7 by the guide 42 on the arm 42ª. This arm 42ª is also rigidly secured to the casing 28. (See Figure 10.) Therefore, it is obvious that as the piston 30 moves up and down a similar motion is imparted to the stem 15 and consequently to the shaping head 9 through the medium of the lever 37; that is to say, as the piston 30 and its stem 32 moves upward, the stem 15 and shaping head 9 are moved downward and vice versa.

It will be noted that the differential piston casing 28, support 39 and guide arm 42ª are secured and carried together as a single unit. Therefore, adjustment of the casing 28 on the standard 60, as hereinbefore described, likewise adjusts the support 39 and the guide arm 42ª. Adjustment of these parts is provided to take care of any variation in positon of the glass blank on the carrier 2; such variation may be caused by the shape and height of the glass blank as well as the speed with which the glass blank is carried through the heating chamber. Also, by this unit construction, the apparatus as a whole may be easily set up or taken down and transferred from one place to another.

We have shown our invention as employed in connection with a continuously moving carrier 2 and it is, therefore, necessary that the shaping head be moved upon and away from the blank at proper intervals and in a minimum length of time while the blank is beneath the shaping head, otherwise distortion of the blank may take place. To provide this, we employ the control valve 43 and its novel actuating mechanism in addition to the mechanism already described. Obviously our invention is not limited in application to a continuously moving blank, but may be employed where the motion of the blank is stopped or arrested during the "cupping-in" operation.

The control valve 43 is rigidly mounted and supported on the vertical standard 60 by the clamp 66. It may be comprised of a casing having a valve chamber 44, into one end of which is connected the constant pressure supply pipe 35 and the other end of which forms a valve seat 45. (See Figure 4.) The supply pipe 35 may be a flexible air pipe or otherwise so that adjustment of the differential piston structure may take place without breaking any pipe connection. Contained in the valve chamber 44 is a valve 46 which is adapted to seat upon the valve seat 45. The valve 46 has an integral and lap fitting stem 47 which extends out through and is guided in and by the valve casing. In the valve casing is a small atmospheric port 48. That portion of the stem 47 adjacent the valve 46 is reduced in diameter such a distance back from the valve 46 that when the valve 46 is closed and stem 47 moved out the small port 48 is open; and when the stem 47 is moved in to unseat the valve 46, the lap-fit portion of the stem 47 closes and cuts off the small port 48. By the reduction in diameter of the stem 47 as just described, a small cavity 49 is formed around such reduced stem. Connected to the small cavity 49 is a pipe 50 which is, preferably, connected by a flexible connection to the pipe 33 leading to the larger face of the piston 30. By this construction, it is obvious that, when the valve 46 in the casing 43 is open and the small port 48 is closed by the stem 47, constant fluid pressure from the pipe 35 is admitted to the valve chamber 44, past valve 46 and through pipes 50 and 33 to the large face of the piston 30 whereupon the piston 30 is moved upward and the shaping head 9 moved downward; and that, when the valve 46 in the casing 43 is closed (see Figure 1), pressure is cut off from the large face of the piston 30 and the said large face is in turn connected to atmosphere by way of pipes 33 and 50, cavity 49 around the stem 47 and atmospheric port 48 whereupon the piston 30 is moved downward and the shaping head 9 moved upward. The lap-fit portion of the stem 47 is provided with a groove 67 into which extends and rides a pin 68. This pin 68 is rigidly secured in the valve casing as shown in Figure 4. The object of this arrangement is to prevent rotary movement of the stem thereby keeping the roller 54 in end of stem extension 52 in a substantially horizontal position.

The protruding end of the stem 47 terminates in a bifurcation as shown in Figures 4, 5 and 6. In the bifurcated portion, just mentioned, we provide drilled holes 51 adapted to receive a bolt or pin 51$^a$. Adapted to be secured in the bifurcated portion of stem 47 is a stem extension 52. That portion of the stem extension 52 which fits into the bifurcation is reduced in thickness and has a hole 53 drilled therein which is adapted to align with the holes 51 in the bifurcated portion of the stem 47 for securing the stem 47 and the extension 52 together. The extreme end of the stem extension 52 is likewise bifurcate and, having holes drilled therein, is adapted to receive a roller 54 which is held in place by a suitably provided pin or bolt 54$^a$. The stem extension 52 is of such length that it extends out and over the endless carrier 2 in the path of the stems 4 of the blank supports on the carrier 2 and is so placed that the stems 4 contact with the roller 54, the friction at the contacting points being reduced to a minimum by this roller.

We desire to effect the out and in movements of the stem 47 and, consequently, the seating and unseating of the valve 46 and the resultant up and down movement of the shaping head 9 in a minimum length of time while the blank is beneath the shaping head. In providing this, we employ a one way-hinge or knife type of joint between the stem 47 and the extension 52 which permits movement of the stem extension 52 in one direction (that is, opposite the direction which the carrier 2 moves and toward the heating chamber 1 as shown in Figure 1) and prevents movement in the opposite direction. We effect this type of joint by rounding the correspondingly opposite outer corners of the bifurcation of the stem 47 as shown in Figures 5 and 8 and by rounding to a similar degree the inner corner of the reduced portion of the stem extension 52 as shown in Figures 5 and 7. The other corners of the respective portions mentioned remain approximately square.

In operation, with the construction just described, as soon as the roller 54 passes the axial center of the support stem 4, it tends to roll on around behind the support stem. This tendency creates an inward pressure on the stem extension 52 toward the heating chamber 1. Also, at this time, the air pressure in the valve chamber 44 is exerting a pressure on the valve 46 and, consequently, an outward pressure upon the stem 47. Therefore, with these conditions existing, the one way-hinge or knife joint between the stem 47 and its extension 52 permits the stem extension 52 to buckle or hinge inward toward the heating chamber 1. As the stem extension buckles or hinges inward, the roller 54 on the extension 52 trips inward behind the support stem 4 and permits the movement of the valve stem 47 to its full outward position toward the carrier 2 and, consequently, the seating of the valve 46 whereupon the large face of the piston 30 is vented to atmosphere and the shaping head 9 is moved upward away from the shaped article. As soon as the support stem 4 has moved from beneath the shaping head 9 and out of alignment with the valve stem 47, extension 52 is moved to its normal contact position by the leaf spring 55 which is rigidly secured at one end to the valve casing 43.

In employing the construction just described, it is readily seen that the shaping head 9 is moved down upon and shapes the blank as soon as the blank moves beneath it, that is, when the stem 4 of the support carrying the blank contacts with the stem extension 52; and that the shaping head 9 is moved away from the shaped article before it has moved from beneath and out of vertical alignment. In other words, due to the buckling or hinging inward of the stem extension 52, the stem 47 is permitted to move outward and valve 46 to seat before the support stem 4 has moved past and out of alignment with the valve stem 47.

In carrying out our invention it is also necessary that means be provided which insure against improper alignment of the blank support, and consequently the glass blank, with the shaping head 9 due to lateral movement of the carrier 2 and blank supports when the stem extension contacts with the support stem 4. We have provided the arm 56 (see Figure 1) for this purpose. This arm 56 may be rigidly supported in any desired manner so as to extend out and over the carrier 2. The extending end of the arm 56 is bifurcate and has holes drilled therein. The bifurcate portion of the arm 56 is adapted to receive a roller 58 held in place by pressing a bolt or pin 57 through the said drilled holes. This arm 56 is so placed that its roller 58 contacts with the stems 4 of the blank supports on the endless carrier 2, but does not exert any lateral pressure thereon. This construction prevents lateral movement of the mold support when the stem extension 52 contacts with the support stem 4, the friction at the contacting portion being reduced to a minimum by the use of the roller 58.

In operation, the glass blank is placed upon a support on the endless carrier 2 and carried through the heating chamber 1. After the blank on its support has passed through the heating chamber 1, and when it is in proper alignment with the shaping head 9, the support stem 4 contacts with the stem extension 52, moving the stem 47 inward so as to unseat the valve 46. When the valve 46 is unseated, the atmospheric port 48 at this time being closed by the stem 47, pressure is admitted from pipe 35, past valve 46, into pipes 50 and 33 to the large face of the piston 30 whereby the said piston 30 is moved upward and the shaping head 9 is moved downward over the glass blank to be shaped. As the shaping head 9 moves downward over the blank, air pressure is automatically admitted to the interior of the blank for the purpose hereinbefore described. As soon as the contact point of the roller 54 in the stem extension 52 passes the center of the support stem 4 the stem 47 is moved by the pressure acting on the valve 46 so as to close the valve 46, thereby cutting off from the large face of the piston 30 the pressure in pipe 35 and in turn connecting the large face of the piston 30 to atmosphere by the way of pipes 33 and 50, cavity 49 and atmosphere connection 48, whereupon the piston 30 is moved downward and the shaping head 9 is moved upward before the shaped blank has moved from beneath and out of alignment with the shaping head. At the completion of this operation, the blank has been properly shaped and the shaping apparatus is in position for again making the cycle just described.

We have shown our invention as adapted to "cupping in" tumblers at a certain turn-in angle, but it is obvious that the angle of turn-in of the tumbler wall may be varied to suit the desired conditions of use without departing from the scope of our invention. Furthermore, although we have shown a certain shaped shaping member, we do not wish to be limited to such shape since it can be readily seen that other shapes may be equally well employed to effect other various shapes in tumblers, dishes, vases, or other similar articles, without departing from the scope of our invention.

Also, we have shown our invention as applied particularly to the "cupping in" of tumblers, but it is obvious to those skilled in the art that it may be equally well applied to such glass articles as dishes, vases, or other similar glass articles.

Having thus described our invention, what we claim is:

1. The method of treating glass containers which comprises heating their edges to plastic condition, applying an external annular forming device to such edges and internally bracing such edges with fluid pressure.

2. The method of treating glass containers which comprises heating their upper edges to plastic condition, and cupping-in such edges by an annular embracing member while internally bracing such edges.

3. The method of treating glass containers which comprises heating their upper edges to plastic condition, cupping-in such edges by an annular embracing member and internally bracing such edges with air pressure.

4. The method of treating glass containers which comprises constricting the upper edges thereof as the containers emerge from a heated zone in a relatively plastic condition while supporting from within by fluid pressure.

5. The method of treating glass containers which comprises embracing only the upper walls thereof as they emerge from a heated chamber in relatively plastic condition while supporting from within by fluid pressure.

6. The method of treating glass containers which comprises shaping only the upper walls thereof as they emerge from a heated chamber in relatively plastic condition with a conical member while supporting from within by fluid pressure.

7. The method of treating glass containers which comprises causing a conical bell member to embrace the open ends of said containers and exert a bending stress upon the exterior surface of the upper portion of the walls thereof while the walls of the containers are being supported from within.

8. The method of treating glass containers which comprises wedging a conical member down over the open end thereof while in a relatively plastic condition and while supporting from within by fluid pressure.

9. The method of treating glass articles which comprises moving the article through a heated atmosphere, and applying a bending stress to the upper portion of the walls of said article to effect a cupping in of the edges thereof as it emerges from said heated atmosphere without stopping the movement thereof.

10. The method of treating glass articles which comprises placing the article upon a continuously moving carrying means, heating the article while it is being carried along and shaping the article by moving a horizontally immovable shaping means thereupon while it is being moved along.

11. The method of shaping glass articles which comprises passing a formed blank through a heating chamber and moving it beneath a horizontally immovable shaping means, moving the shaping means upon the heated blank and moving said shaping means away from the shaped blank before it has moved out of alignment therewith.

12. In an apparatus for shaping formed blanks, a heating chamber, means for carrying the blank through said heating chamber, means for applying a bending stress to the exterior surface of the upper portion of the walls of said blanks, means for internally supporting the walls of said blank during the action of the stress applying means, and means for stopping the action of the stress applying means before the said blank carrying means has moved out of alignment with said stress applying means.

13. The method of "cupping in" tumblers which comprises heating a formed blank, and passing a shaping member over the open end of the blank while supporting the entire interior of the blank.

14. The method of "cupping in" the open ends of tumblers which comprises heating a formed tumbler and passing a shaping member over the open end thereof, while supporting the interior by fluid pressure.

15. An apparatus for shaping glass containers comprising means for carrying the article to be shaped, means for heating the article while it is being moved along, and means for applying a bending stress to the exterior surface of the upper portion of the walls of said containers without interfering with the course of travel of said containers.

16. An apparatus for shaping glass containers comprising means for carrying the article to be shaped, means for heating the article while it is being moved along, and means for applying a bending stress to the exterior surface of the upper portion of the walls of said containers without interfering with the course of travel of said containers, and supporting the containers from within.

17. An apparatus for shaping glass containers comprising means for carrying the article to be shaped, means for heating the article while it is being moved along, and means for applying a bending stress to the exterior surface of the upper portion of the walls of said containers without interfering with the course of travel of said containers, and supporting the walls of said containers from within by fluid pressure.

18. An apparatus for shaping glass containers comprising means for carrying the article to be shaped, means for heating the article while it is being moved along, mechanical means for shaping the article externally without interfering with its travel, and simultaneously shaping said article internally with fluid pressure.

19. An apparatus for shaping glass containers comprising means for carrying the article to be shaped, means for heating the article while it is being moved along, means for shaping the article externally without interfering with its travel and simultaneously effective fluid pressure means, controlled by the movement of said external shaping means for shaping the article internally.

20. An apparatus for shaping formed glass blanks which comprises a heating chamber, means for conveying the formed blanks through said heating chamber, an annular member to embrace the exterior surface of the upper portion of the walls of said blanks, and means for shaping the said blanks internally to conform substantially to its external shape.

21. An apparatus for shaping formed glass blanks which comprises a heating chamber, means for conveying the formed blank through said heating chamber, an annular embracing member operating in timed relation with the blank carrying means for applying a bending stress to the exterior surface of the upper portion of the walls of said blanks, and fluid pressure means for shaping the said blank internally.

22. An apparatus for shaping formed glass blanks which comprises means for heating the blanks, continuous means for conveying the blank during heating, means for shaping the said blank externally while it is progressing along, and fluid pressure means controlled by movement of the said external shaping means for shaping the blank internally.

23. An apparatus for shaping formed glass blanks which comprises a heating chamber, means for conveying the formed blank through said heating chamber, means for applying a bending stress to the exterior surface of the upper portion of the walls of said blanks, and means operated by the movement of said stress applying means for admitting fluid pressure to the interior of said blank.

24. An apparatus for shaping formed glass blanks which comprises a heating chamber, means for conveying the formed blank through the said heating chamber, means for shaping the said blank externally while moving along, and fluid pressure means for supporting the entire blank internally while being shaped externally.

25. An apparatus for shaping formed glass blanks which comprises a heating chamber, means for conveying the formed blank through the said heating chamber, means for shaping the said blank externally while moving along, and fluid pressure means controlled by movement of the external shaping means for shaping the blank internally.

26. An apparatus for shaping formed glass blanks which comprises a heating chamber, means for conveying the formed blank through the said heating chamber, means for shaping the said blank externally while progressing along, and fluid pressure means controlled by movement of the external shaping means for supporting the entire blank internally.

27. In apparatus for shaping formed glass articles, a heating chamber, means for carrying the articles through said heating chamber, and reciprocating means for applying a bending stress to the exterior surface of the upper portion of the walls of said heated articles.

28. In apparatus for shaping formed blanks, a heating chamber, means for carrying the blanks through said heating chamber, automatically actuated means for applying a bending stress to the exterior surface of the upper portion of the walls of said blanks, and means for moving said stress applying means out of contact with the shaped glass article before said glass article has moved out of alignment with said stress applying means.

29. In an apparatus for shaping formed blanks, a heating chamber, means for carrying the blank through the heating chamber, means for shaping the blank externally, means for applying fluid pressure for shaping the blank internally, and means for discontinuing said fluid pressure before the shaped glass article has moved out of shaping contact with the external shaping means.

30. In an apparatus for shaping formed blanks, a heating chamber, means for carrying the blank through the heating chamber, means for shaping the blank externally, means for applying fluid pressure for shaping the blank internally during external shaping, and means for discontinuing the application of said fluid pressure before the shaped glass article has moved out of shaping contact with the external shaping means.

31. In an apparatus for shaping formed blanks, a heating chamber, continuously moving means for carrying the blanks through said heating chamber, means for applying a bending stress to the exterior surface of the upper portion of the walls of said blanks while the blanks are moving, means for shaping the blanks internally, and means for arresting the action of stress applying means before the said blank carrying means has moved out of alignment with said stress applying means.

32. An apparatus for shaping formed blanks, comprising a heating chamber, continuous carrier means for conveying the blank through the heating chamber, a horizontally immovable shaping head, means for moving the said shaping head upon the blank when the blank is directly beneath, means for applying air pressure to the interior of the blank when the shaping head is upon the blank, and means for moving the said shaping head from the finished glass article before it has moved from beneath the said shaping head.

33. An apparatus for shaping formed blanks, comprising a heating chamber, continuously moving carrier means for conveying the blank through the heating chamber, a shaping head movable in one direction only, automatically actuated means for moving the said shaping head upon the blank when the blank is directly beneath, means for applying air pressure to the interior of the blank when the shaping head is upon the blank, and means for moving the said shaping head from the finished glass article before it has moved from beneath the said shaping head.

34. An apparatus for shaping formed blanks comprising a heating chamber, continuously moving carrier means for conveying the blanks through said heating chamber, an embracing member for applying a bending stress to the upper portion of the walls of said blank, means controlled by the movement of the blank carrying means for moving said embracing member upon the blank when the blank is directly beneath, means for applying air pressure to the interior of the blank when the embracing member is in contact with the walls of the blank, and means for moving said embracing member from the finished glass article before it has moved from beneath said embracing member.

35. An apparatus for shaping formed blanks comprising a heating chamber, carrier means for conveying the blanks through said heating chamber, an embracing member for applying a bending stress to the upper portion of the walls of said blank, means for moving said embracing member into contact with the walls of the blank when said blank is directly beneath, means for applying air pressure to the interior of the blank when the embracing member is in contact with the walls of said blank, and means controlled by the movement of said blank carrying means for moving said embracing member from the finished glass article.

36. In an apparatus for shaping glass articles, continuously moving means for carrying the article, means for supporting said article on the said carrying means, means for heating the article as it is moved along, a shaping member, and valve mechanism for controlling the movement of the said shaping member to and from the moving glass article while such article is in alignment therewith, said valve mechanism comprising a valve having a stem which extends out and over the article carrying means so that its outer end contacts with the said article supporting means, the said stem being so jointed that its contacting end will hinge or buckle in a direction opposite the movement of the said glass article before said glass article has moved out of alignment with the said shaping member.

37. In an apparatus of the type described, the combination of an article carrying means, a shaping means, valve mechanism for controlling the movement of the shaping means upon and away from the article shaped, said valve mechanism comprising a valve having an attached stem which carries a roller at its outer end for contacting with the article carrying means as it passes to actuate the said valve to move the said shaping means upon the said article, said stem being jointed to hinge or buckle in a direction opposite the movement of the article carrying means whereby the contacting portion of the said stem moves behind and past the said article carrying means to actuate the said valve to move the said shaping means away from the said article before it has moved from beneath said shaping means.

38. The method of constricting the open end of a plastic glass tumbler which comprises moving a forming tool thereonto and applying fluid pressure to the interior of said tumbler to prevent distortion of any other part thereof.

39. That step in the manufacture of glass articles which comprises cupping-in the open end thereof with an externally applied means and simultaneously supporting the interior of said article to prevent distortion thereof by applying fluid pressure.

40. The method of reducing the circumference of the open end of a plastic glass article which comprises applying a conical reducing tool to the exterior of said article while applying fluid pressure to the interior thereof to shape the interior of said article and prevent distortion thereof by said reducing tool.

41. An apparatus for shaping glass containers comprising means for carrying the article through a heating zone, an annular member for applying a bending stress to the exterior surface of the upper portion of the walls of said containers to effect a "cupping in" of the edges thereof, and fluid pressure means for shaping the containers internally.

In testimony whereof we hereby affix our signatures.

VIRGIL O. CORNWELL.
ALBERT MOELLER.